United States Patent [19]
Watkins

[11] Patent Number: 5,472,331
[45] Date of Patent: Dec. 5, 1995

[54] APPARATUS FOR SENSING PRESSURE IN MOLD CAVITY DURING INJECTION OF MOLDED PARTS

[75] Inventor: Brad H. Watkins, Traverse City, Mich.

[73] Assignee: RJG Technologies, Inc., Traverse City, Mich.

[21] Appl. No.: 250,914

[22] Filed: May 31, 1994

[51] Int. Cl.$^6$ .................................................. B29C 47/78
[52] U.S. Cl. .................. 425/149; 264/40.5; 264/334; 425/556
[58] Field of Search ................................. 425/149, 556; 264/40.5, 334

[56]  References Cited

U.S. PATENT DOCUMENTS

| | | |
|---|---|---|
| 3,807,914 | 4/1974 | Paulson et al. ........................ 425/149 |
| 3,840,312 | 10/1974 | Paulson et al. ........................ 425/149 |
| 3,853,000 | 12/1974 | Barnett et al. . |
| 4,060,362 | 11/1977 | Wilson, III ........................... 425/149 |
| 4,342,233 | 8/1982 | Edmondson et al. . |
| 4,478,089 | 10/1984 | Aviles et al. . |
| 4,760,749 | 8/1988 | Groleau . |
| 4,847,779 | 7/1989 | Masao et al. . |
| 4,925,619 | 5/1990 | Sparrow et al. . |

FOREIGN PATENT DOCUMENTS 2227616  10/1987  Japan ..................................... 425/149

*Primary Examiner*—Tim Heitbrink
*Attorney, Agent, or Firm*—Warner Norcross & Judd

[57]  ABSTRACT

An apparatus for approximating the mold cavity pressure during injection of a liquid material by measuring the pressure exerted by the liquid against the ejector assembly. The ejector assembly includes an ejector sleeve and a support. A load sensor is positioned between the load and support to measure the pressure. Preferably, a force translation fixture is positioned between the ejector sleeve and the sensor. In a first alternative embodiment, the sensor is omitted and a strain gauges are mounted on the fixture to measure the elastic deformation of the fixture and approximate mold cavity pressure. In a second alternative embodiment, the strain gauges are mounted on a reduced diameter portion of the tubular wall of the ejector sleeve. In a third alternative embodiment, the base of the ejector sleeve is separated into two lobes connected to one another by two bending beams. Strain gauges mounted on the lobes and bending beams measure the elastic deformation of the flange to approximate pressure. And in a fourth alternative embodiment, strain gauges are applied to the core pin to approximate pressure in the mold cavity.

19 Claims, 4 Drawing Sheets

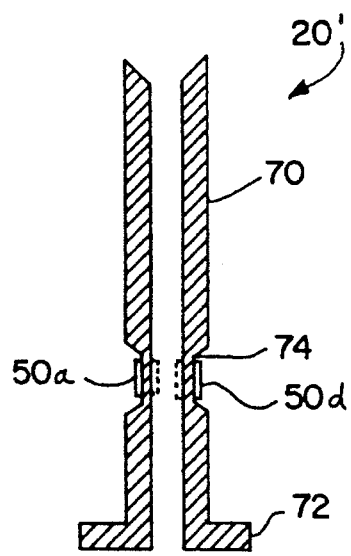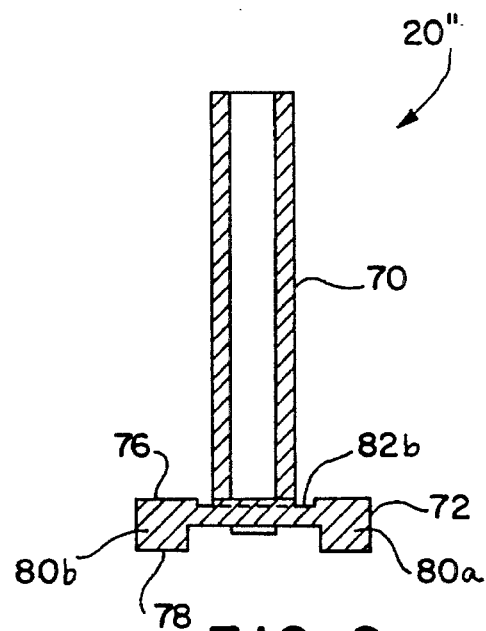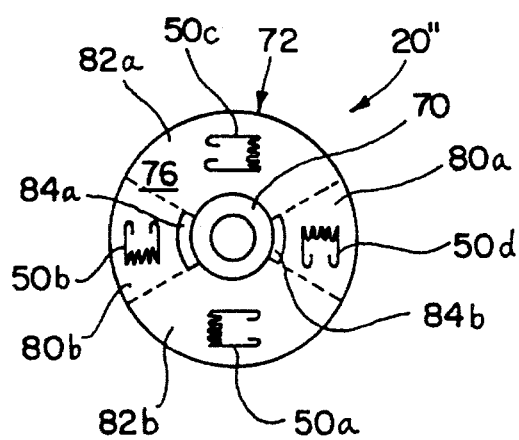

APPARATUS FOR SENSING PRESSURE IN MOLD CAVITY DURING INJECTION OF MOLDED PARTS

BACKGROUND OF THE INVENTION

The present invention relates to injection molding equipment and more particularly to equipment for measuring pressure in a mold cavity during injection of molded parts.

Injection molding processes generally involve the injection of a liquid material into a mold cavity for curing. The resulting molded article must be removed, or ejected, from the opened mold after curing. The equipment for removing molded articles from a mold is referred to as the ejector assembly. Often, the ejector assembly includes ejector pins which are retracted during molding and are extended during ejection to force the article from the opened mold. In the case of concave molded parts formed over a core pin, the ejector assembly includes a sleeve encircling and riding along the core. The sleeve is retracted during molding and is extended during ejection to ride along the core and force the article off the core pin.

In order to achieve the highest quality finished parts, the liquid material must be injected into the mold cavity at the proper pressure. In extreme instances, insufficient pressure may lead to porous, pitted or incomplete parts. On the other hand, excessive pressure may damage the molding apparatus or result in seam lines along mating portions of the mold halves. Under normal processing conditions, part dimensions, strength, and general quality are dependant upon consistent mold pressure.

A prior technique for measuring the pressure within a mold cavity during injection uses a flush-mount style transducer, such as a strain gauge or peizoelectric type transducer. The transducer is mounted directly on the interior surface of the mold cavity in contact with the part to measure the cavity pressure. When mounted on a cosmetic surface of the mold cavity, the transducer leaves an undesired mark on the surface of the article. Secondly, many molds do not lend themselves well to the installation of a flush-mount style transducer. For example, the mold may include obstructions or the transducer may interfere with proper functioning of the mold.

SUMMARY OF THE INVENTION

The aforementioned problems are overcome by the present invention wherein pressure within a mold cavity during injection is approximated by measuring the force applied to the ejector assembly and core pin by the injected liquid. More particularly, the force applied to the ejector assembly is measured using conventional strain-gauge technology.

In the disclosed embodiment, the invention further includes a force translation fixture that is seated between the ejector sleeve and the ejector plate of the ejector assembly. The force translation fixture is generally ring-shaped and includes a series of fulcrums which translate one half of the ejector sleeve total force onto the domed button of a conventional load cell mold pressure transducer. The mold pressure transducer is positioned between the ejector plate and the force translation fixture to monitor the mold cavity pressure transferred through the ejector sleeve and the fixture.

In a first alternative embodiment, the mold pressure transducer is replaced by another fulcrum to create a ring force transducer. The elastic deformation of the ring is measured by a series of conventional strain gauges applied or bonded to the fixture. The elastic deformation of the fixture is translated into mold pressure.

In a second alternative embodiment, the ejector sleeve is modified to receive a series of strain gauges that measure its elastic deformation. The strain gauges are located at a portion of the ejector sleeve where the diameter has been turned down to produce a concentrated compression stress path.

In a third alternative embodiment, the ejector sleeve includes a flanged section at the base of the ejector tube. The strain gauges are placed on bending beams incorporated into the flanged section at the base of the ejector tube. The gauges can be located alternatively on the upper or lower surface of the flanged portion.

In a fourth alternative embodiment, the elastic deformation of the core pin is measured by a series of conventional strain gauges applied or bonded to the core pin. The strain gauges are located at a portion of the core pin where the diameter has been turned down to produce a concentrated compression stress path.

The present invention provides a simple, practical and inexpensive means for monitoring the pressure within a mold cavity during injection molding. Force concentration paths are readily incorporated into the force translation fixture, ejector sleeve, or core pin without affecting the strength, integrity, or function of the mold halves. In addition, the present invention does not mark or otherwise blemish the surface of the molded article.

These and other objects, advantages, and features of the present invention will be more fully understood and appreciated by reference to the detailed description of the preferred embodiment and the drawings.

BRIEF DESCRIPTION OF THE DRAWINGS

FIG. 8 is a sectional view of a second alternative embodiment showing an ejector sleeve with strain gauges located on a reduced diameter portion of the ejector tube;

FIG. 9 is a sectional view of a third alternative embodiment showing an ejector sleeve with strain gauges located on a flanged base section having a bending beam design;

FIG. 10 is a top plan view of the ejector sleeve and strain gauges of the third alternative embodiment.

DETAILED DESCRIPTION OF THE PREFERRED EMBODIMENT

Figure 1:
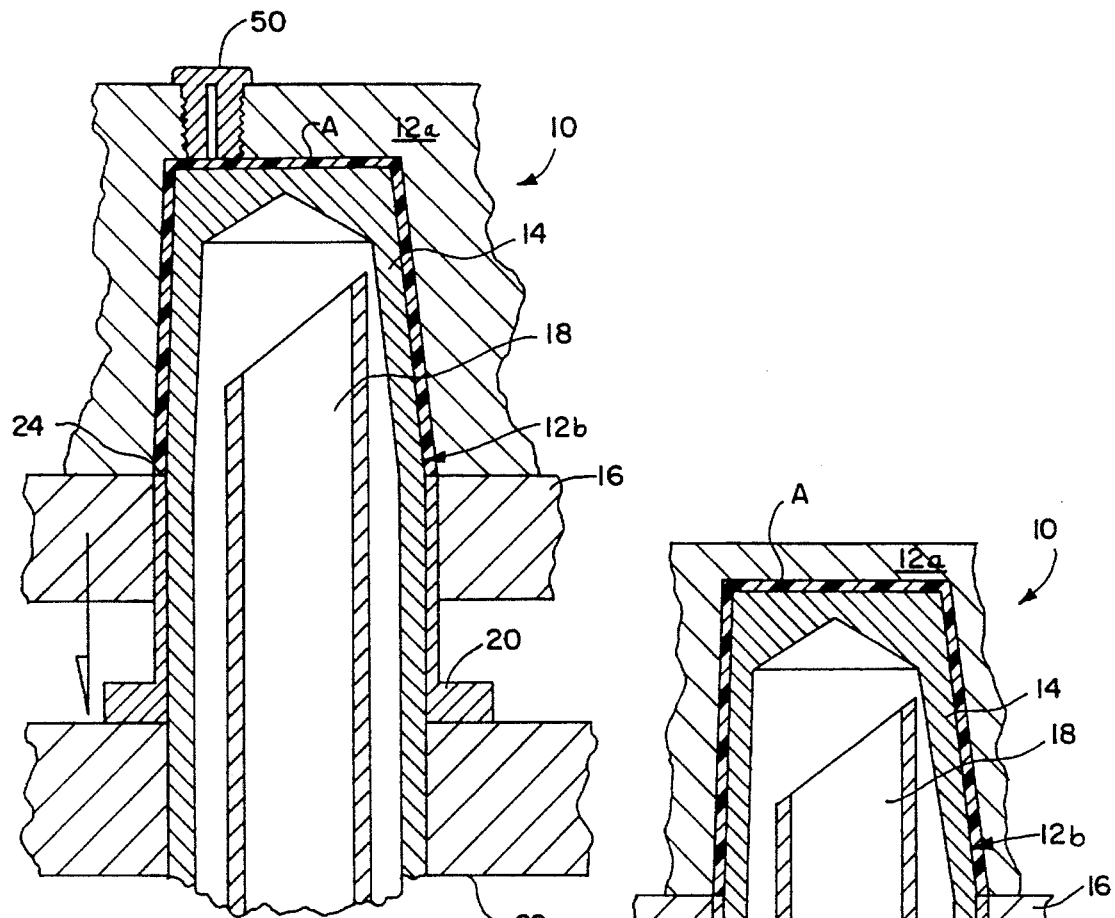
FIG. 1 is a fragmentary sectional view of a prior art molding apparatus for a concave article with a flush mount pressure transducer on the upper mold half.

A conventional injection molding apparatus incorporating a core pin and ejector sleeve is illustrated in FIG. 1 and generally designated 10. In this depiction, the injection process is complete and a molded article A remains in the mold cavity. In general, the mold cavity is defined by the upper mold half 12a, the lower mold half 12b, and the ejector sleeve 20. The lower mold half 12b includes a generally cylindrical core pin 14 which extends through a mold fixture 16. A cooling tube 18 extends into a void in the center of the core pin 14 to supply gas or fluid to speed the curing process of the article A. Ejector sleeve 20 surrounds the core pin 14 and is slidably mounted for movement in and out of the lower portion of the mold cavity. During the molding process, the upper surface 24 of the ejector sleeve 20 acts as a portion of the lower surface of the mold cavity. This places the ejector sleeve 20 in direct contact with the molded article A. An ejector plate 22 is positioned below and abuts with the ejector sleeve 20. The ejector plate 22 is secured to hydraulic means (not shown) which lift the ejector plate 22 to push the ejector sleeve 20 into the lower portion of the mold cavity and force out the molded article A.

According to the prior art, the pressure in the mold cavity is measured by a conventional flush-mount sensor 50 mounted directly to the surface of either mold half. FIG. 1 shows sensor 50 mounted to the exterior surface of the upper mold half 12a and extending inwardly to the surface of the mold cavity. As liquid is injected into the mold cavity, sensor 50, which is in direct contact with the liquid, measures the pressure in the mold cavity.

Figure 2:
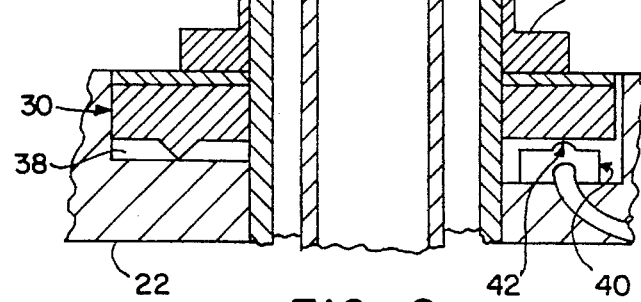
FIG. 2 is a fragmentary sectional view of the molding apparatus of the present invention.

The pressure in the mold cavity is translated into a force onto the ejector sleeve 20 during the injection process. FIG. 2 illustrates an injection molding apparatus 10 according to the present invention wherein a force translation fixture 30 and mold pressure transducer 40 are incorporated into the ejector plate 22 to monitor the force on the ejector sleeve 20. The ejector plate 22 is modified to include a circular recessed portion 38 for seating the fixture 30 and transducer 40.

The mold pressure transducer 40 is a conventional load-cell type transducer that includes a domed button 42 for receiving the force. The transducer 40 is interposed between the fixture 30 and the ejector plate 22 in recessed portion 38 to monitor the pressure between the ejector plate 22 and the force translation fixture 30.

Figure 3:
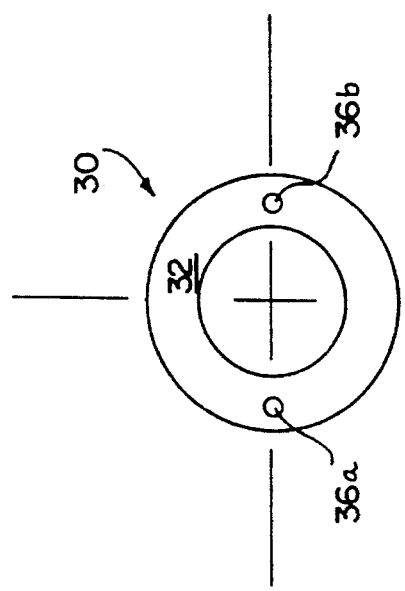
FIG. 3 is a top plan view of the force translation fixture incorporated into the ejector assembly.
Figure 4:
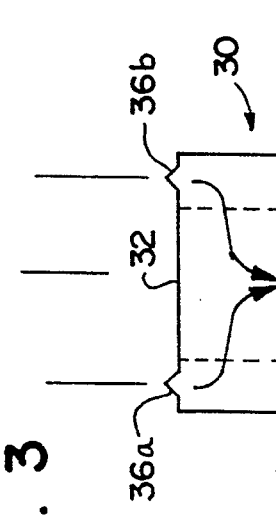
FIG. 4 is a front elevational view of the force translation fixture.
Figure 5:
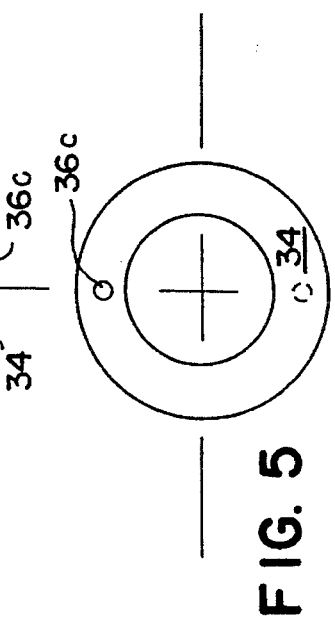
FIG. 5 is a bottom plan view of the force translation fixture.

As perhaps best illustrated in FIGS. 3–5, the force translation fixture 30 is generally ring-shaped and includes an upper surface 32 and a lower surface 34. A series of fulcrums 36a–c are positioned upon the upper and lower surfaces of the fixture 30 to transfer one half of the total force onto the domed button 42 of the mold pressure transducer 40. The first two fulcrums 36a and 36b are positioned at 0 and 180 degrees on the upper surface 32 of the fixture 30. The third fulcrum 36c is positioned at 90 degrees on the lower surface of the fixture 30. The fixture 30 is located in the recessed portion 38 of the ejector plate 22 such that the domed button 42 of the transducer 40 contacts the lower surface 34 of the fixture 30 at 270 degrees, acting as a fourth fulcrum.

In operation, the mold cavity pressure is translated to the ejector sleeve 20 as liquid is injected into the mold cavity. The two fulcrums 36a–b located on the upper surface 32 of the fixture are in contact with the base 21 of the ejector sleeve 20 and create force paths that focus one half of the translated sleeve force onto opposite radial sides of the fixture 30. The two force paths combine on the underside of the fixture to focus one half of the total ejector sleeve force on the third fulcrum 36c and the other half on the domed button 42 of the transducer 40.

First Alternative Embodiment

Figure 6:
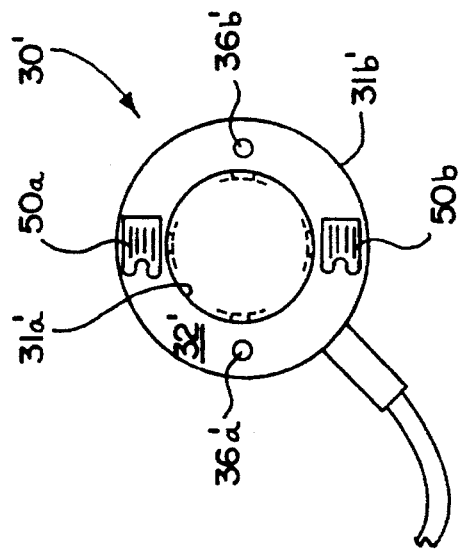
FIG. 6 is a top plan view of a ring force transducer according to an alternative embodiment.
Figure 7:
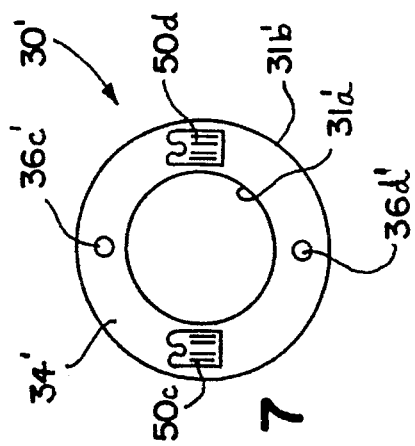
FIG. 7 is a bottom plan view of the ring force transducer according to the alternative embodiment.

A first alternative embodiment of the present invention is depicted in FIGS. 6 and 7 and assumes the same detail as the force translation fixture 30. However, in this embodiment, a fourth fulcrum 36d' is added to the lower surface 34' of the fixture 30' at 270 degrees. In addition, the mold pressure transducer is replaced by four conventional strain gauges 50a–d wired in a 4-arm Wheatstone bridge making a ring force transducer. The strain gauges 50a–d are of a type well known to those of ordinary skill in the art and are positioned on the upper and lower surfaces 32' and 34' of the fixture 30'. The first two strain gauges 50a–b are located at 90 and 270 degrees on the upper surface 32' of the fixture 30', and the second two strain gauges 50c–d are located at 0 and 180 degrees on the lower surface 34'. This arrangement positions a strain gauge opposite each fulcrum 36a'–d' where the elastic deformation of the upper and lower surfaces 32' and 34' of the fixture 30' will be concentrated.

Alternatively, the strain gauges 50a–d can be positioned at spaced intervals on the interior surface 31a' or exterior surface 31b' of the circumferential wall 31' of the fixture 30'. FIG. 6 depicts in phantom lines the strain gauges 50a–d located at alternative positions along the interior surface 31a' of the circumferential wall 31'. The strain gauges 50a–d are placed at spaced locations immediately adjacent each fulcrum 36a'–d' where the elastic deformation of the circumferential wall 31' will be concentrated.

Second Alternative Embodiment

In a second alternative embodiment of the present invention, strain gauges 50a–d are located on the circumferential wall 70 of the ejector sleeve 20'. Referring now to FIG. 8, the ejector sleeve 20' includes a circumferential wall 70 and a flange 72 that extends outward from the base of the circumferential wall 70. The circumferential wall 70 of the ejector sleeve 20' includes a reduced diameter portion 74. The reduced diameter portion 74 is weaker than the remainder of the ejector sleeve 20' and thereby concentrates the elastic deformation of the sleeve 20'. Four strain gauges 50a–d wired in a 4-arm Wheatstone bridge are positioned at radially symmetric spaced locations on the exterior surface of the reduced diameter portion 74 of the ejector sleeve 20'. Alternatively, as shown in FIG. 8 in phantom lines, the strain gauges 50a–d can be positioned at spaced locations along the interior surface of the reduced diameter portion 74 of the ejector sleeve 20'.

Third Alternative Embodiment

A third alternative embodiment of the present invention is depicted in FIGS. 9 and 10. In this embodiment, the flange 72 includes a pair of lobes 80a–b connected to one another by bending beams 82a–b. The bending beams 82a–b have a thickness substantially less than that of the lobes 80a–b. In addition, the lobes 80a–b are radially separated from the circumferential wall 70 of the ejector sleeve 20" by through holes 84a–b. In this manner, the elastic deformation of the flange 72 is concentrated on the bending beams 82a–b. As perhaps best illustrated in FIG. 10, four strain gauges 50a–d wired in a 4-arm Wheatstone bridge are positioned at spaced locations along the upper surface 76 of the flange 72. Preferably, a single strain gauge is located at each lobe 80a–b and each bending beam 82a–b. As will be readily apparent to one of ordinary skill in the art, the strain gauges can alternatively be located on the lower surface 78 of the flange 72.

Fourth Alternative Embodiment

Figure 11:
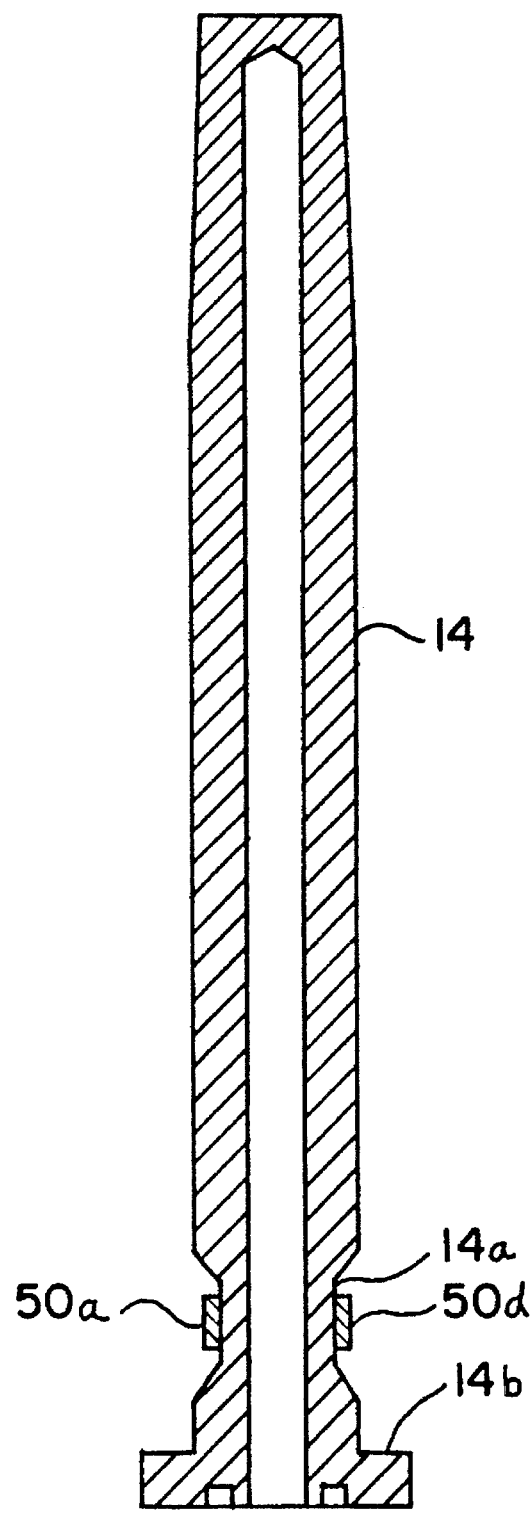
FIG. 11 is a sectional view of the core pin and strain gauges of the fourth alternative embodiment.

A fourth alternative embodiment of the invention is depicted in FIG. 11. In this embodiment, the core pin 14 serves as a force transducer to detect pressure in the mold cavity. Preferably, a conventional 4-arm Wheatstone strain gauge bridge 50a–d is applied to a reduced diameter portion 14a of the core pin 14 as described in connection with the second alternative embodiment. The strain gauges 50a–d measure the elastic deformation of the pin 14 resulting from the compression force placed on the core pin 14 during pressurization of the mold cavity. Alternatively, strain gauges 50a–d can be applied to the flange portion 14b of the pin 14 as described in the third alternative embodiment.

The above descriptions are those of preferred embodiments of the invention. Various alterations and changes can be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. An apparatus for measuring mold cavity pressure, comprising:

an injection mold defining a mold cavity;

an ejector assembly including at least one ejection element mounted for reciprocal movement into and out of the mold cavity to eject molded articles from said mold, said ejector assembly including an ejector sleeve mounted adjacent to the mold cavity and an ejector plate mounted adjacent said ejector sleeve opposite the mold cavity; and pressure sensing means for measuring a pressure imparted to said at least one ejection element, said sensing means including a force translation fixture interposed between said ejector sleeve and said ejector plate, said force translation fixture being generally ring-shaped and including a first surface in contact with said ejector sleeve and a second surface in contact with said ejector plate; and wherein said first surface includes first and second fulcrums located radially opposite one another, and said second surface includes a third fulcrum located radially midway between said first and said second fulcrums.

2. The apparatus of claim 1, further comprising a pressure transducer interposed between said force translation fixture and said ejector plate, said transducer located radially opposite said third fulcrum.

3. The apparatus of claim 2, wherein said pressure transducer includes a domed button, said domed button contacting said force translation fixture at a point radially opposite said third fulcrum.

4. The apparatus of claim 1, wherein said force translation fixture includes a fourth fulcrum located radially opposite said third fulcrum; and wherein said sensing means further includes a deformation sensing means for sensing the elastic deformation of said force translation fixture, said deformation sensing means being affixed to a surface of said force translation fixture.

5. The apparatus of claim 4, wherein said deformation sensing means includes a plurality of strain gauges wired in a Wheatstone bridge.

6. An apparatus for measuring mold cavity pressure, comprising:

an injection mold defining a mold cavity;

an ejector assembly including an ejector sleeve mounted for reciprocal movement into and out of the mold cavity to eject molded articles from said mold, said ejector sleeve including an ejector tube having a reduced diameter portion for concentrating the stress applied to said ejector sleeve; and pressure sensing means for measuring the pressure imparted to said ejector sleeve, said sensing means including a deformation sensing means for sensing the elastic deformation of said ejector tube, said deformation sensing means being affixed to a surface of said reduced diameter portion.

7. The apparatus of claim 6, wherein said deformation sensing means includes a plurality of strain gauges.

8. An apparatus for measuring mold cavity pressure, comprising:

an injection mold defining a mold cavity;

an ejector assembly including at least one ejection element mounted for reciprocal movement into and out of the mold cavity to eject molded articles from said mold, said ejector assembly including an ejector sleeve, said ejector sleeve including an ejector tube and a base portion, said base portion including a plurality of beams extending radially outward from said ejector tube and a plurality of lobes radially detached from said ejector tube and extending circumferentially between said beams; and pressure sensing means for measuring the pressure imparted to said at least one ejection element, said sensing means including deformation sensing means for sensing means for sensing the elastic deformation of said base portion of said ejector sleeve, said sensing means being affixed to a surface of said base portion.

9. The apparatus of claim 8, wherein said base portion includes two lobes and two beams; and wherein said deformation sensing means includes four strain gauges wired in a Wheatstone bridge, one of said strain gauges being affixed to a surface of each of said lobes and said beams.

10. An apparatus for approximating mold cavity pressure during injection of liquid material, comprising:

an ejector assembly;

a force translation fixture interposed between a first component of said ejector assembly and a second component of said ejector assembly, said force translation fixture being generally ring-shaped and including a first surface and a second surface, said first surface including first and second fulcrums located radially opposite one another, and said second surface including a third fulcrum located radially midway between said first and said second fulcrums; and a pressure sensing means for measuring a pressure imparted to said force translation fixture.

11. The apparatus of claim 10, wherein said pressure sensing means includes a pressure transducer interposed between said second surface of said force translation fixture and the ejector assembly, said transducer located radially opposite said third fulcrum.

12. The apparatus of claim 10, wherein said second surface includes a fourth fulcrum located radially opposite said third fulcrum and radially midway between said first and second fulcrums; and wherein said pressure sensing means includes at least one strain gauge mounted to said fixture.

13. An ejector sleeve for ejecting an article from a mold cavity and for monitoring mold cavity pressure, comprising;

an ejector sleeve including an ejector tube having a reduced diameter portion for concentrating the stress applied to said ejector sleeve; and a sensing means for sensing a pressure applied to said ejector sleeve, said sensing means mounted to said ejector sleeve, said sensing means including a deformation sensing means for sensing the elastic deformation of said ejector tube, said deformation sensing means being affixed to a surface of said reduced diameter portion.

14. The apparatus of claim 13, wherein said deformation sensing means includes a plurality of strain gauges.

15. An ejector sleeve for ejecting an article from a mold cavity and for monitoring mold cavity pressure, comprising;

an ejector sleeve including an ejector tube and base portion, said base portion including a plurality of beams extending radially outward from said ejector tube and a plurality of lobes radially detached from said ejector tube and extending circumferentially between said lobes; and a sensing means for sensing the pressure applied to said ejector sleeve, said sensing means mounted to said ejector sleeve, said sensing means including deformation sensing means for sensing the elastic deformation of said base portion of said ejector sleeve, said sensing means being affixed to a surface of said base portion.

16. The apparatus of claim 15, wherein said deformation sensing means includes a plurality of strain gauges.

17. The apparatus of claim 16, wherein said base portion includes two lobes and two beams; and wherein said deformation sensing means includes four strain gauges wired in a 4-arm Wheatstone bridge, one of said strain gauges being affixed to a surface of each of said lobes and said beams.

18. An injection mold apparatus capable of measuring mold cavity pressure during injection of a liquid material, said apparatus comprising:

an injection mold having a core pin defining a portion of the mold cavity, said core pin including a reduced diameter portion for concentrating the stress applied to said core pin; and measuring means mounted to a surface of said reduced diameter portion of said core pin for measuring a force exerted on said core pin during injection of a liquid material, whereby the measured force provides an approximation of the mold cavity pressure.

19. An injection mold apparatus capable of measuring mold cavity pressure during injection of a liquid material, said apparatus comprising:

an injection mold having a core pin defining a portion of the mold cavity, said core pin including a base having a plurality of beams extending radially outward from said core pin and a plurality of lobes radially detached from said core pin and extending circumferentially between said beams; and measuring means mounted to a surface at said base portion said core pin for measuring a force exerted on said core pin during injection of a liquid material, whereby the measured force provides an approximation of the mold cavity pressure.

* * * * *